United States Patent
Hijikata

[11] Patent Number: 5,718,880
[45] Date of Patent: Feb. 17, 1998

[54] METHOD OF INCREASING THE BULK DENSITY OF IRON OXIDE POWDER

[75] Inventor: Taiichi Hijikata, Toyokawa, Japan

[73] Assignee: Sintokogio, Ltd., Nagoya, Japan

[21] Appl. No.: 693,464

[22] Filed: Aug. 2, 1996

[30] Foreign Application Priority Data

Aug. 11, 1995 [JP] Japan ................. 7-227495

[51] Int. Cl.$^6$ ................. C01G 49/02; C22B 1/14
[52] U.S. Cl. ................. 423/632; 423/633; 423/634; 106/456
[58] Field of Search ................. 423/632, 633, 423/634; 106/456; 241/19, 30, 39, 43; 75/232

[56] References Cited

U.S. PATENT DOCUMENTS

| | | | |
|---|---|---|---|
| 5,316,746 | 5/1994 | Narita et al. | 423/632 |
| 5,635,154 | 6/1997 | Arai et al. | 423/632 |

FOREIGN PATENT DOCUMENTS

| | | | |
|---|---|---|---|
| 6-115944 | 4/1994 | Japan | 423/632 |

OTHER PUBLICATIONS

WPIDS Abstract No. 83-35484K which is an abstract of Japanese Patent Specification No. 58-036931 (Mar. 1993).

WPIDS Abstract No. 89-096657 which is an abstract of Japanese Patent Specification No. 01-044300 (Feb. 1989).

WPIDS Abstract No. 95-057110 which is an abstract of Japanses Patent Specification No. 06-335800 (Dec. 1994).

WPIDS Abstract No. 97-134771 which is an abstract of Japanese Patent Specification No. 09-052717 (Feb. 1997).

*Primary Examiner*—Anthony Green
*Attorney, Agent, or Firm*—Limbach & Limbach L.L.P.

[57] ABSTRACT

A method is provided of rapidly increasing the bulk density of an iron oxide powder by preventing the powder, processed by a roller consolidation machine, from flying up. The method consists of feeding an iron oxide powder, whose apparent bulk density is 0.4–0.6, into a sealed tank, depressurizing the tank to a vacuum of 100–200 torr, and revolving the rotating roller and rotating plow at a revolving speed of 1–2 m/sec.

1 Claim, 1 Drawing Sheet

METHOD OF INCREASING THE BULK DENSITY OF IRON OXIDE POWDER

TECHNICAL FIELD

This invention relates to a method of increasing the bulk density of an iron oxide powder by using a roller consolidation machine.

BACKGROUND OF THE INVENTION

When an iron oxide powder is processed to increase its bulk density by using a roller consolidation machine, which is equipped with a roller rotating about a vertical axis, revolvably mounted on a bottom plate of a sealed tank, and a rotating plow for guiding the powder onto an orbit of the rotating roller, there is a problem in that the machine requires a long processing time. This is because much of the iron oxide powder flies up or away because the rotating roller and plow move, and it is not satisfactorily caught under the roller, since the iron oxide powder is slippery and has a strong flashing property due to its low apparent density and due to air between the particles of powder.

This invention was devised considering the above problems so as to provide a method which can quickly increase the apparent density by using a roller consolidation machine to reduce the flying up of the iron oxide powder so that most of it is caught under the roller.

SUMMARY OF THE INVENTION

To achieve the above purpose, the method of this invention for increasing the bulk density of an iron oxide powder by using a roller consolidation machine or consolidator having a roller rotating about a vertical axis, revolvably mounted on a bottom plate of a sealed tank, and a rotating plow for guiding a powder onto an orbit of the rotating roller, is characterized by feeding an iron oxide powder, whose apparent bulk density is 0.4–0.6, into the sealed tank, depressurizing the tank to a vacuum of 200–100 torr, and revolving the rotating roller and rotating plow at a revolving speed of 1–2 m/sec.

EMBODIMENTS

Experiments were carried out by using a consolidation machine, and resultant experimental measurements of the bulk density of an iron oxide powder were obtained as in FIG. 1. The machine is equipped with two rotating rollers, so-called mullers, each having a diameter of 1000 mm and a load of 600 kg, and each disposed on a bottom plate of a sealed tank with no space between the rollers and the bottom plate. The sealed tank communicates with a vacuum pump. 50 kg of iron oxide powder with an apparent specific gravity of 0.154 was fed into the sealed tank. The iron oxide powder was processed by setting the revolving speed of the rotating roller at 1.28 m/sec. The pressure in the sealed tank was set at 160 torr in one case and 760 torr (atmospheric pressure) in another. The bulk density (specific gravity) was observed in each case at points of time after 3, 5, 7, and 10 minutes. As a result, it was found that the bulk density of the iron oxide powder processed in the sealed tank under a pressure of 160 torr rapidly increases after 3–5 minutes, and then the rate of increase gradually decreases.

On the other hand, it was also found that the bulk density of the iron oxide powder processed under atmospheric pressure (760 torr) gradually increases from the beginning, but the bulk density is lower than that of the powder processed under 160 torr, even after 10 minutes. This is because due to the reduced pressure in the sealed chamber in the first case, in contrast to the second case, almost all the iron oxide powder is prevented from flying up, and is effectively caught under the rotating rollers.

As a result of experimental processes, wherein the pressure in the sealed tank is varied, it is further found that the lower the pressure, the better the obtained results. However, no significant effect is obtained when a pressure below 100 torr is used, and when a pressure of more than 200 torr is used the bulk density can hardly be increased rapidly within a short time, of 3–5 minutes. Accordingly, it is recognized that a pressure of 100–200 torr in the sealed tank is preferable for the process, and that the processing effects as in FIG. 1 are obtained by using a revolving speed for the rotating roller of 1–2 m/sec, although this speed is to be changed in accord with the size of the roller consolidation machine.

As is clear from the above descriptions, the roller consolidation machine of this invention can rapidly increase the bulk density of an iron oxide powder by reducing its flying up by using a vacuum of 100–200 torr for the sealed tank and a revolving speed of 1–2 m/sec for the rollers and plow.

Figure 1:
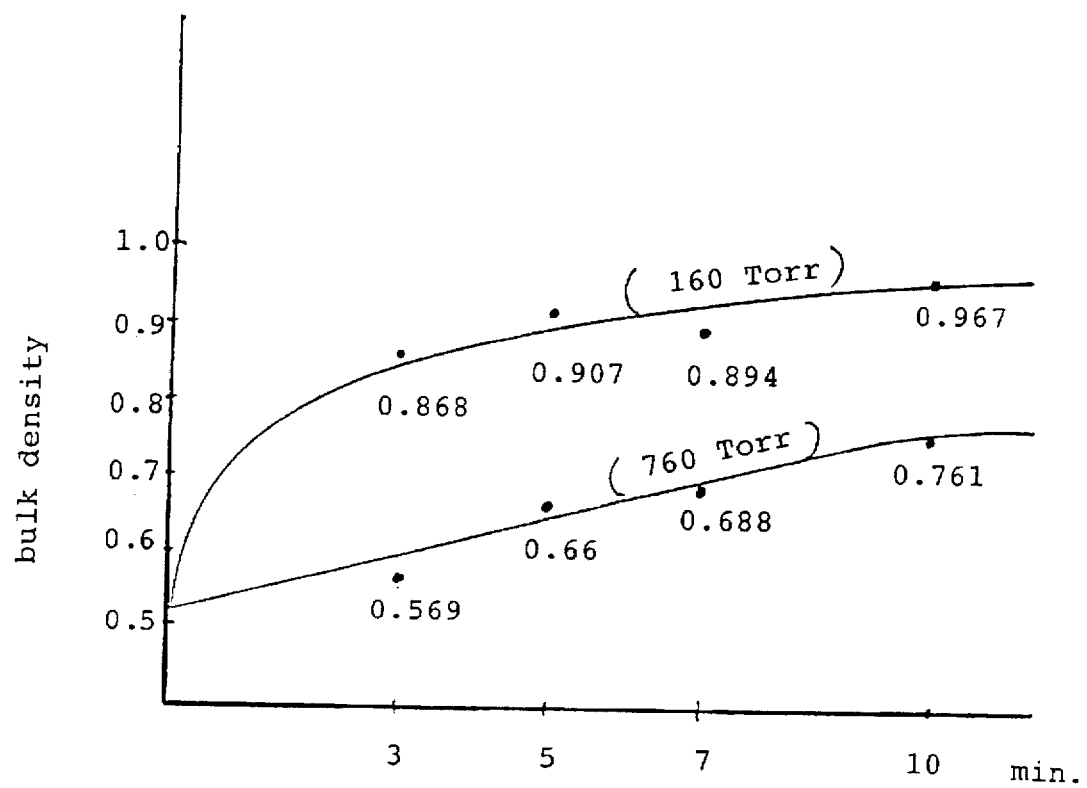
FIG. 1 is a graph showing relationships between the time to process the powder and its bulk density, for two experiments, one carried out under a reduced pressure and one carried out under atmospheric pressure.

What is claimed is:

1. A method of increasing a bulk density of an iron oxide, wherein a roller consolidation machine has a roller rotating about a vertical axis, revolvably mounted on a bottom plate of a sealed tank, and a rotating plow for guiding the iron oxide onto an orbit of the rotating roller, comprising feeding an iron oxide powder, whose apparent bulk density is 0.4–0.6, into the sealed tank, depressurizing the tank to a vacuum of 100–200 torr, and revolving the rotating roller and rotating plow at a revolving speed of 1–2 m/sec.

* * * * *